(12) United States Patent
Ariizumi et al.

(10) Patent No.: US 11,056,280 B2
(45) Date of Patent: Jul. 6, 2021

(54) MULTILAYER CERAMIC ELECTRONIC COMPONENT

(71) Applicant: TDK CORPORATION, Tokyo (JP)

(72) Inventors: Takuma Ariizumi, Tokyo (JP); Toshihiko Kaneko, Tokyo (JP); Nobuto Morigasaki, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/511,030

(22) Filed: Jul. 15, 2019

(65) Prior Publication Data

US 2020/0043657 A1 Feb. 6, 2020

(30) Foreign Application Priority Data

Jul. 31, 2018 (JP) .............................. JP2018-144525

(51) Int. Cl.
| | |
|---|---|
| *C04B 35/468* | (2006.01) |
| *H01G 4/12* | (2006.01) |
| *H01G 4/30* | (2006.01) |
| *H01G 4/005* | (2006.01) |
| *C04B 35/628* | (2006.01) |
| *C04B 35/49* | (2006.01) |
| *C04B 111/00* | (2006.01) |
| *C04B 111/94* | (2006.01) |

(52) U.S. Cl.
CPC ......... *H01G 4/1218* (2013.01); *C04B 35/468* (2013.01); *C04B 35/49* (2013.01); *C04B 35/62897* (2013.01); *H01G 4/005* (2013.01); *H01G 4/30* (2013.01); *C01P 2004/62* (2013.01); *C04B 2111/00939* (2013.01); *C04B 2111/94* (2013.01)

(58) Field of Classification Search
CPC ...... H01G 4/1218; H01G 4/30; C04B 35/468; C04B 35/4682; C04B 2235/3224; C04B 2235/3236
See application file for complete search history.

(56) References Cited

U.S. PATENT DOCUMENTS

| | | | |
|---|---|---|---|
| 6,785,121 B2 * | 8/2004 | Nakano | H01G 4/12 361/321.2 |
| 9,305,708 B2 * | 4/2016 | Kai | H01G 4/1236 |
| 2012/0162858 A1 | 6/2012 | Tanaka et al. | |

FOREIGN PATENT DOCUMENTS

JP 2002-265260 A 9/2002

* cited by examiner

*Primary Examiner* — Noah S Wiese
(74) *Attorney, Agent, or Firm* — Oliff PLC

(57) ABSTRACT

The object of the present invention is to provide a multilayer ceramic electronic component having improved highly accelerated lifetime and specific permittivity. A multilayer ceramic electronic component comprising a multilayer body in which an internal electrode layer and a dielectric layer are stacked in alternating manner, wherein the dielectric layer comprises a dielectric ceramic composition having a main component expressed by a general formula $ABO_3$ (A is Ba and the like, and B is Ti and the like) and a rare earth component R, a segregation phase including the rare earth component R exists in the dielectric layer, an area ratio of the segregation phases in a cross section along a stacking direction is 104 ppm to 961 ppm, and 96% or more of a total area of the segregation phases contact with the internal electrode layer.

5 Claims, 3 Drawing Sheets

MULTILAYER CERAMIC ELECTRONIC COMPONENT

BACKGROUND OF THE INVENTION

The present invention relates to a multilayer ceramic electronic component such as a multilayer ceramic capacitor in which an internal electrode layer and a dielectric layer are stacked in alternating manner.

Recently, electronic devices have become more compact and have attained higher density. Along with this, a multilayer ceramic electronic component such as a multilayer ceramic capacitor and the like are also demanded to become more compact, to attain higher capacity, and to have improved reliability. Thus, it has been attempted to attain improved reliability of the multilayer ceramic electronic component and also to increase the stacking number of dielectric layers of the multilayer ceramic electronic component and also to make the dielectric layer itself thinner.

Patent document 1 discloses a dielectric ceramic and a multilayer type electronic component capable of improving the reliability of highly accelerated lifetime test even after making a dielectric layer thinner by having a $\gamma$-$Y_2Si_2O_7$ crystal phase which is in a grain boundary phase of the dielectric layer. Further, it also discloses that specific permittivity and dielectric loss of the dielectric ceramics can be enhanced.

However, in the multilayer ceramic electronic component discussed in Patent document 1, many $\gamma$-$Y_2Si_2O_7$ having different composition compared to a main component composition exist in the dielectric layer. In general, such different phase has a higher resistance compared to a main component phase. Thus, resistance varies in a stacking direction between a part having a different phase and a part which does not have different phase; and electric field becomes non-uniform between internal electrode layers which cause local deterioration of the dielectric layer. As a result, the highly accelerated lifetime becomes shorter and in some case a sufficient specific permittivity may not be obtained.

Patent document 1: JP Patent Application Laid Open No. 2002-265260

SUMMARY OF THE INVENTION

The present invention has been attained in view of such circumstances, and the object is to provide a multilayer ceramic electronic component having improved highly accelerated lifetime and specific permittivity.

In order to attain the above object, the multilayer ceramic electronic component according to the present invention has a multilayer body in which an internal electrode layer and a dielectric layer are stacked in alternating manner, wherein the dielectric layer comprises a dielectric ceramic composition having a main component expressed by a general formula $ABO_3$ (A is at least one selected from the group consisting of Ba, Sr, and Ca; and B is at least one selected from the group consisting of Ti, Zr, and Hf) and a rare earth component R (R is at least one selected from the group consisting of Sc, Y, La, Ce, Pr, Nd, Pm, Sm, Eu, Gd, Tb, Dy, Ho, Er, Tm, Yb, and Lu), a segregation phase including the rare earth component R exists in the dielectric layer, an area ratio of segregation phases in a cross section along a stacking direction is 104 ppm to 961 ppm, and 96% or more of a total area of the segregation phases contacts with the internal electrode layer.

In the dielectric layer of the multilayer ceramic electronic component of the present invention, segregation phases including a rare earth element R exist in a certain ratio, and most of these are localized in an area which contact with the internal electrode layer. Thereby, the highly accelerated lifetime and the specific permittivity can be improved without lowering a dielectric loss 6 and insulation resistance. Also, as the segregation phases localize in an area which contact the internal electrode, non-uniform electric field caused by the segregation phase is solved, thus the highly accelerated lifetime and the specific permittivity can be further improved.

Preferably, a maximum length of the segregation phases in the stacking direction is 100% or less of the average thickness of the internal electrode layer. Also, preferably, 50% or more of the total segregation phases in terms of number base are embedded in the internal electrode layer.

That is, according to the preferable embodiment of the present invention, a segregation phase exists by being embedded in the internal electrode layer, thereby non-uniform electric field caused by the segregation phase is solved, and the highly accelerated lifetime and specific permittivity can be further improved. Also, according to the preferable embodiment of the present invention, because the maximum length of the segregation phase in the stacking direction is smaller than the average thickness of the internal electrode, the area of the segregation phase in the dielectric layer can be sufficiently small. Thus, the electric field applied to the dielectric layer can be uniform, and the highly accelerated lifetime can be improved to 140 hours or longer.

DETAILED DESCRIPTION OF THE INVENTION

Figure 1:
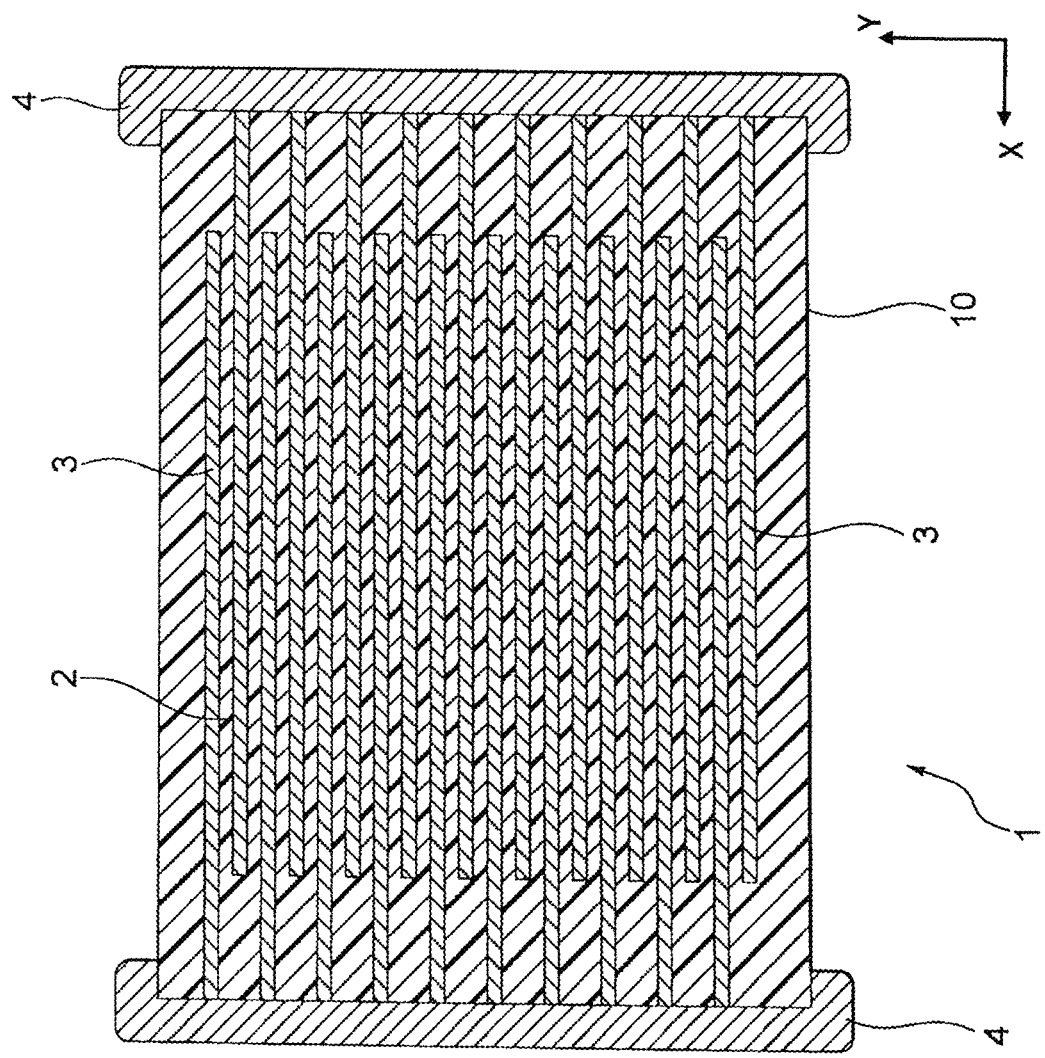
FIG. 1 is a cross section of a multilayer ceramic capacitor according to one embodiment of the present invention.

Hereinafter, the present invention will be described in detail based on an embodiment shown in figures.

<Multilayer Ceramic Capacitor 1>

The multilayer ceramic capacitor 1 according to an embodiment of the present invention has a capacitor element main body 10 having a dielectric layer 2 and an internal electrode layer 3 in alternating manner. At both ends of this element main body 10, a pair of external electrodes 4 are formed which connects with the internal electrode layer 3 placed alternatingly in the element main body 10. A shape of the element main body 10 is not particularly limited, and usually it is rectangular parallelepiped shape. Also, a size of the element main body 10 is not particularly limited, and it may be any appropriate size depending on the purpose of use.

<Dielectric Layer 2>

The dielectric layer 2 is constituted from a dielectric ceramic composition. The dielectric ceramic composition includes a main component of a compound having a perovskite type crystal structure and expressed by a general formula $ABO_3$ (A is at least one selected from the group consisting of Ba, Ca, and Sr; and B is at least one selected from the group consisting of Ti, Zr, and Hf). Further, as a subcomponent, the dielectric ceramic composition includes oxides of rare earth component R (R is at least one selected from the group consisting of Sc, Y, La, Ce, Pr, Nd, Pm, Sm, Eu, Gd, Tb, Dy, Ho, Er, Tm, Yb, and Lu) and also if necessary includes oxides of Si. Note that, an amount of oxygen (O) may slightly deviate from the stoichiometric composition of the above formula.

In the present embodiment, the compound constituting the main component is preferably expressed by a compositional formula $(Ba_{1-x-y}Ca_xSr_y)TiO_3$.

In the present embodiment, B site atom may be Ti alone, or other element besides Ti (for example Zr and Hf) may be included in B site atom. In this case, if a content of atom besides Ti is 0.3 atom % or less with respect to 100 atom % of B site atom, then it can be considered as an impurity amount.

Also, a molar ratio of A site atom (Ba, Sr, and Ca) and B site atom (Ti) is shown as A/B ratio, and in the present embodiment, A/B ratio is preferably 0.98 to 1.02. Note that, "x" and "y" can be within any range, and preferably it is within below range.

In the present embodiment, "x" of the above formula is preferably $0 \leq x \leq 0.1$. An atomic ratio of Ca is represented by "x", and by having "x" within the above range, a capacitance temperature coefficient and a specific permittivity can be controlled. In the present embodiment, Ca does not necessarily have to be included.

In the present embodiment, "y" of the above formula is preferably $0 \leq y \leq 0.1$. An atomic ratio of Sr is represented by "y", and by having "y" within the above range, a specific permittivity at room temperature can be improved. In the present embodiment, Sr does not necessarily have to be included.

In the present embodiment, the dielectric layer includes oxides of rare earth elements as the subcomponent. The content of the oxides of rare earth element may be determined based on desired properties; however it is preferably 0.9 to 2.0 mol and more preferably 0.9 to 1.7 mol in terms of $R_2O_3$ with respect to 100 mol of $ABO_3$. If the content of the oxides of rare earth element is too little, it is difficult to generate the below described segregation phase, thus the area ratio of the segregation phase becomes small. However, improvement of the properties due to the addition of the oxides of rare earth element becomes insufficient, and the highly accelerated lifetime may not improve. On the other hand, if the content of oxides of rare earth element is too much, the area ratio of the segregation phase increases, and the highly accelerated lifetime may not improve.

The rare earth element is at least one selected from the group consisting of Sc, Y, La, Ce, Pr, Nd, Pm, Sm, Eu, Gd, Tb, Dy, Ho, Er, Tm, Yb, and Lu; and preferably it is at least one selected from group consisting of Y, Tb, Dy, Gd, Ho, and Yb; and particularly preferably it includes Dy.

In the present embodiment, the dielectric layer preferably includes oxides including Si as the subcomponent. A content of oxides including Si may be determined based on the desired properties; however it is preferably 0.6 to 1.2 mol and more preferably 0.8 to 1.1 mol in terms of $SiO_2$ with respect to 100 mol of $ABO_3$. Note that, as the oxides including Si, it may be a composite oxide and like made of Si and other metal element (for example, alkaline metal or alkaline earth metal), and in the present embodiment, preferably it is oxides of Si.

In the present embodiment, the above mentioned dielectric ceramic composition may include other subcomponents depending on the desired properties.

For example, the dielectric ceramic composition according to the present embodiment may include oxides of at least one element selected from the group consisting of Ba, Mn, Mg, and Cr. A content of oxides is preferably 0.02 to 1.6 mol in terms of each oxide with respect to 100 mol of $ABO_3$.

Also, the dielectric ceramic composition according to the present embodiment may include oxides of at least one element selected from the group consisting of V, Ta, Nb, Mo, and W. A content of oxides is preferably 0.02 to 0.30 mol in terms of each oxide with respect to 100 mol of $ABO_3$.

A thickness of the dielectric layer 2 is not particularly limited, and it may be determined accordingly depending on the desired properties and the purpose of use, and preferably it is 1.5 to 10 μm and more preferably 1.7 to 5.0 μm or so. Also, the number of the dielectric layer 2 being stacked is not particularly limited, and preferably it is 20 or more, more preferably 50 or more, and particularly preferably 100 or more.

The dielectric layer of the present embodiment is constituted by the dielectric particles having $ABO_3$ as the main component, and in the dielectric particle, a metal element such as the rare earth element is solid dissolved as the subcomponent. The dielectric particle preferably has a so-called core-shell structure, but a complete solid solution type particle may be included.

Figure 2:
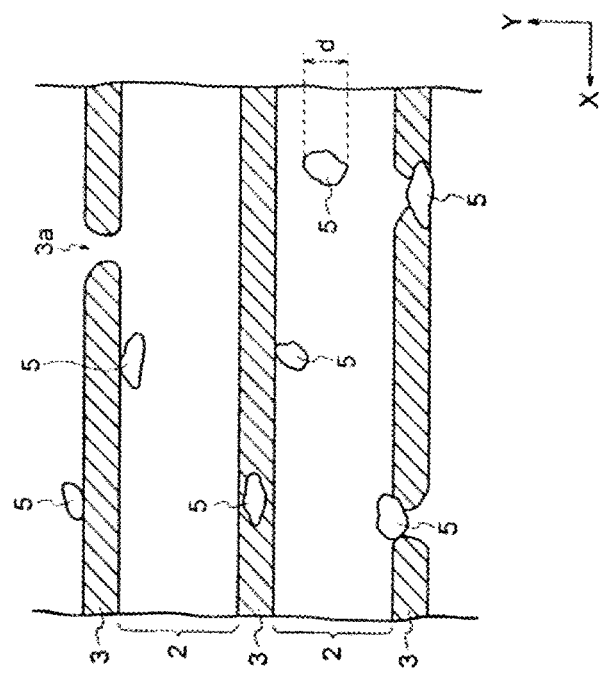
FIG. 2 is a schematic cross section of enlarged essential part of FIG. 1.

Note that, in FIG. 1 and FIG. 2, in order to make the explanation easier, the dielectric particle in the dielectric layer is not shown, but the dielectric particle is actually placed densely, and particle boundary is formed between these particles, and a segregation phase 5 exists separately from the dielectric particle.

An average particle size of the dielectric particle may be determined depending on the thickness of the dielectric layer 2. Note that, the average particle size of the dielectric particle is not particularly limited, and it is preferably 0.1 to 1 μm or so. The average particle size of the dielectric particle is measured by a method which is usually performed. For example, the element main body 10 is cut along the stacking direction of the dielectric layer 2 and the internal electrode layer 3, and an area of the dielectric particle in the cross section is measured, the diameter is calculated as a circle equivalent diameter then it is multiplied by 1.27 to obtain the particle size. The particle size is measured for 200 or more of the dielectric particles, and the value at 50% frequency of the cumulative frequency distribution of the obtained particle sizes is considered as the average particle size (unit: μm).

<Segregation Phase>

FIG. 2 is an enlarged schematic figure of a cross section of the multilayer ceramic capacitor 1 shown in FIG. 1. In the present embodiment, the presence of the segregation phase at the cross section of the center part was observed, but the observation area is not limited to the center part of the multilayer ceramic capacitor.

As shown in FIG. 2, the segregation phase 5 exists in inner layers of the capacitor element main body 10 in which the dielectric layer 2 and the internal electrode layer 3 are stacked in alternating manner. Note that, in FIG. 2, the size of the segregation phase 5 is exaggerated. The segregation phase 5 is observed as a particle having clearly different contrast from the dielectric layer and the internal electrode layer when a cross section of the multilayer ceramic capacitor 1 is observed by scattered electrons using scanning electron microscope (FE-SEM). Also, the segregation phase 5 can be confirmed by STEM-EDS mapping analysis. The area ratio of the segregation phases 5 is 104 ppm to 961 ppm. Here, the area ratio of the segregation phases 5 refers to an area ratio of the segregation phases with respect to an entire observation field when the inner layers is observed in an observation field where 20 layers or more of the internal electrode layers can be seen. Eight images are taken per one sample, and the average thereof is defined as the area ratio of the segregation phases.

The segregation phase 5 is observed as clearly different phase from the dielectric layer and the internal electrode layer. The composition of the segregation phase is not particularly limited, in case the rare earth element mentioned in above as the subcomponent is included as a main component and Si is used as a subcomponent, the segregation phase is a composite oxide of the rare earth element and Si in many cases. Therefore, the segregation phase 5 may include the rare earth element as the main component and may include Si and other elements if needed.

In the present embodiment, as shown in FIG. 2, many segregation phases 5 including the rare earth element exist near the internal electrode layer, and 96% or more of the total area of segregation phases is in contact with the internal electrode layer. The segregation phase 5 is observed as a particle having different shape, and many of them among all of the particles are in contact with the internal electrode layer. That is, the total area of segregation phases contacting the internal electrode layer is 96% or more of entire segregation phases, and particularly preferably all of the segregation phases are in contact with the internal electrode layer.

Here, by referring that the segregation phase is in contact with the internal electrode layer, this means that a part identified as the internal electrode layer and a part identified as the segregation phase share at least part of outlines of each other.

Also, 50% or more of segregation phases in terms of number base are preferably embedded in the internal electrode layer. The ratio of the segregation phases embedded in the internal electrode layer is preferably 65% or more and particularly preferably 80% or more with respect to all of the segregation phases.

Here, the segregation phase embedded in the internal electrode layer refers to a phase of which 50% or more of the entire length of the outline of the particle identified as the segregation phase shares the outline of the internal electrode layer. In case the segregation phase exists in the internal electrode layer, a sharing ratio of the outline of the segregation phase with the internal electrode layer is 100%.

When the segregation phase exists by contacting the internal electrode layer and preferably by being embedded in the internal electrode layer, non-uniform electric field caused by the segregation phase is relieved and elongates the highly accelerated lifetime and also improves the specific permittivity.

Also, the maximum length (d) of the segregation phase along the stacking direction is preferably 100% or less with respect to an average thickness of the internal electrode layer. Here, the maximum length (d) of the segregation phase along the stacking direction refers to a maximum value among length of each segregation phase in a direction the internal electrode layer and the dielectric layer are stacked (Y-axis direction of figure) as shown in FIG. 2. Specifically, a diameter in a fixed direction along the stacking direction (Y-axis direction) as shown in FIG. 2 is measured for each segregation phase, and the maximum length (d) refers to the maximum value among these. The average thickness of the internal electrode layer refers to an average value of a distance between an upper face and a bottom face of the internal electrode layer which is measured from 100 or more arbitrary places of the internal electrode layer. The maximum length (d) of the segregation phase in the stacking direction is more preferably 95% or less with respect to the average thickness of the internal electrode layer.

By controlling the size of the segregation phase as mentioned in above, an area interfering the dielectric layer can be made sufficiently small. As a result, local concentration of the electric field caused by the presence of the segregation phase can be suppressed, thus the properties of the dielectric layer are maintained, the highly accelerated lifetime can be improved to 140 hours or longer, and the specific permittivity can be improved.

<Internal Electrode Layer 3>

A conductive material included in the internal electrode layer 3 is not particularly limited, and in the present embodiment, Ni or Ni alloy is preferable. As Ni alloy, an alloy made of Ni and at least one element selected from the group consisting of Mn, Cr, Co, and Al is preferable; and a content of Ni in the alloy is preferably 95 wt % or more. Note that, in Ni and Ni alloy, various trace amount components such as P and the like may be included in an amount of 0.1 wt % or less or so. The thickness of the internal electrode layer 3 may be determined based on the purpose of use.

As shown in FIG. 2, when the internal electrode layer 3 is enlarged, in some case there is a part where the internal electrode layer should be formed not formed (discontinuous part 3a). This discontinuous part 3a is formed for example by losing the conductive material because a space between conductive material particles adjacent to each other becomes wider when the conductive material particle (mainly Ni particle) becomes spherical due to a particle growth while firing.

In the cross section shown in FIG. 2, the internal electrode layer 3 appears to be discontinuous due to this discontinuous part 3a, but the discontinuous part 3a sporadically exists on a main face of the internal electrode layer 3. Thus, even if the internal electrode layer 3 is discontinuous at the cross section shown in FIG. 2, the internal electrode layer 3 is continuous from other cross section, and a conductivity of the internal electrode layer 3 is secured. The discontinuous part 3a is formed to the internal electrode layer 3 usually in a ratio of 3 to 35% with respect to an ideal length.

In the present embodiment, by having the segregation phase 5 at the discontinuous part 3a, a mechanical strength of the multilayer ceramic capacitor 1 further improves, thus it is preferable to have the segregation phase at the discontinuous phase 3a.

<External Electrode 4>

A conductive material included in the external electrode 4 is not particularly limited, and in the present invention, inexpensive Ni, Cu, and alloys thereof can be used. A thickness of the external electrode 4 may be determined accordingly depending on the purpose of use.

<Method of Producing Multilayer Ceramic Capacitor 1>

The multilayer ceramic capacitor 1 of the present embodiment is produced as similar to the conventional multilayer ceramic capacitor, that is the green chip is produced by a printing method or a sheet method using a paste, and firing is carried out, followed by printing or transferring of the external electrode then firing, thereby the multilayer ceramic capacitor 1 of the present embodiment is produced. Hereinafter, the production method will be explained.

First, a dielectric raw material for forming the dielectric layer is prepared, then this is made into a paste, thereby a dielectric layer paste is prepared.

As the dielectric raw material, a raw material of $ABO_3$, a raw material of oxides of rare earth element, and if necessary a raw material of oxides including Si and a raw material of other subcomponents are prepared. As these raw materials, oxides of the above mentioned component and the mixture thereof, and composite oxides can be used, and also various compounds which form the above mentioned oxides and composite oxides by firing, such as carbonate, oxalate, nitrate, hydroxides, organometal compound, and the like can be selected accordingly and mixed for use. In the present embodiment, it is preferable to use a mixture in which the raw material of the oxides of rare earth element and if necessary the raw material of oxides including Si and other subcomponents are uniformly dispersed to $ABO_3$ main component. However, a dielectric raw material in which the main component is covered with additive components such as the rare earth component, Si, and the like may be used.

Note that, as the raw material of $ABO_3$, those produced by various methods such as a so called solid phase method and various liquid phase methods (for example an oxalate method, a hydrothermal synthesis method, an alkoxide method, a sol gel method, and the like) can be used.

Further, in case other components besides the above mentioned main component and subcomponents are included in the dielectric layer, as the raw materials of such components, as similar to the above, oxides of such components or a mixture thereof, and composite oxides can be used. Also, in addition, various compounds which become the above mentioned oxides and the composite oxides by firing can be used as well.

A content of each compound in the dielectric raw material may be determined so that the dielectric ceramic composition attains the composition shown in above after firing. The particle size of the main component material before made into a paste is usually an average particle size of 0.1 to 0.5 µm or so. The particle size of the subcomponent raw material is preferably an average particle size of 10 to 200 nm, more preferably 30 to 150 nm, and particularly preferably 40 to 120 nm. If the particle size of the subcomponent is too large, a segregation phase is easily formed, and the area ratio of segregation phases may increase in some cases. Note that, in the present specification, the particle size of the dielectric raw material is measured by a usual method. For example, the particle of the raw material itself is observed by an electron microscope such as SEM, TEM, or the like to measure the area of the particle of the raw material from the image, and a diameter is calculated as a circle equivalent diameter, then it is multiplied by 1.27, thereby the particle size is obtained. The particle diameter is measured for 200 or more of the particles, and the value at 50% frequency of the cumulative frequency distribution of the obtained particle sizes is defined as the average particle size (unit: µm or nm).

The dielectric layer paste may be an organic paste kneaded with the dielectric raw material and the organic vehicle, or it may be a water-based paste.

The organic vehicle is obtained by dissolving a binder in an organic solvent. The binder is not particularly limited, and may be properly selected from variety of usual binders such as ethylcellulose, polyvinyl butyral, and the like. Also, the organic solvent is not particularly limited, and may be appropriately selected from variety of organic solvents such as terpineol, butyl carbitol, acetone, toluene, and the like so to suit with a method used such as a printing method, a sheet method, and the like.

Also, when using a water-based dielectric layer paste, dielectric raw materials can be kneaded with a water-based vehicle obtained by dissolving an aqueous binder, a dispersant, and the like in water. The aqueous binder used for a water-based vehicle is not particularly limited, and for example, polyvinyl alcohol, cellulose, aqueous acrylic resin, and the like may be used.

An internal electrode layer paste may be prepared by kneading the above mentioned organic vehicle with the conductive materials made of the above mentioned Ni or Ni alloy; or various oxides, organometallic compound, resinate, and the like which become the above mentioned Ni or Ni alloy after firing. Also, an inhibitor may be included in the internal electrode layer paste. As the inhibitor, it is not particularly limited, and preferably the inhibitor has the same composition as the main component.

An external electrode paste may be prepared as same as the above mentioned internal electrode layer paste.

The content of organic vehicle in each of the above mentioned pastes is not particularly limited, and may be a usual content, for example, the binder is 1 to 5 wt % or so and the solvent is 10 to 50 wt % or so. Also, in each paste, if needed additives may be included which are selected from variety of dispersants, plasticizers, dielectrics, insulators, and the like. The total contents of these are preferably 10 wt % or less.

When using the printing method, the dielectric layer paste and the internal electrode layer paste are printed on a substrate such as PET and the like to form layers, and after cutting into a predetermined shape, the green chip is obtained by removing from the substrate.

Also, in case of using a sheet method, a green sheet is formed by using the dielectric layer paste, and the internal electrode layer paste is printed on the green sheet. Then, these are stacked and cut into a predetermine shape to form a green chip.

Before firing, the green chip is subjected to a binder removal treatment. The binder removal conditions are a temperature increasing rate of preferably 5 to 300° C./hour, a holding temperature of preferably 180 to 900° C., and a temperature holding time of preferably 0.5 to 48 hours. Also, the binder removal atmosphere is air or reduced atmosphere.

After carrying out binder removal, the green chip is fired. In the firing step of the present embodiment, a temperature increasing rate is preferably 500° C./hour or faster, more preferably 800° C./hour or faster, and particularly preferably 1200° C./hour or faster. The upper limit of the temperature increasing rate is not particularly limited, and it is preferably 5000° C./hour or less so that excessive burden is not applied to a machine. Also, the holding temperature while firing is preferably 1200 to 1350° C., more preferably 1220 to 1340° C., and particularly preferably 1240 to 1320° C. depending on the dielectric material composition. Also, the temperature holding time is preferably 0.2 to 1.5 hours depending on the dielectric material composition. By employing such firing conditions, the segregation phase including the rare earth element is easily localized near the internal electrode layer.

The atmosphere of firing is preferably a reduced atmosphere, and preferably wet mixed gas of $N_2$ and $H_2$ can be used.

Also, the oxygen partial pressure may be determined depending on the type of the conductive material in the internal electrode layer paste, and in case of using base metals such as Ni, Ni alloy, and the like as the conductive material, the oxygen partial pressure is preferably $1.0 \times 10^{14}$ to $1.0 \times 10^{-10}$ MPa. A temperature decreasing rate is not particularly limited, and in the preferable embodiment, the temperature decreases in a rate of 500 to 5000° C./hour within a high temperature range which is between the holding temperature and 1000° C., and the temperature decreases in a rate of 50 to 500° C./hour within a low temperature range which is 1000° C. or lower.

In the present embodiment, the annealing treatment (oxidizing treatment of the dielectric layer) is preferably carried out to the element main body after firing. Specifically, the holding temperature of the annealing treatment is preferably 1100° C. or less, and more preferably 950 to 1090° C. The holding time is preferably 0.1 to 20 hours, and more preferably it is 2 to 4 hours. Also, an atmosphere while carrying out the oxidation treatment is preferably wet $N_2$ gas (oxygen partial pressure: $1.0 \times 10^{-9}$ to $1.0 \times 10^{-5}$ MPa).

In case of using $N_2$ gas, a mixed gas, and the like during the above mentioned binder removal treatment, firing, and annealing treatment, for example a wetter and the like may be used. In this case, a water temperature is 5 to 75° C. or so.

The binder removal treatment, firing, and annealing treatment may be performed continuously or independently.

By controlling the firing conditions as mentioned in above, the segregation phase including the rare earth element as the main component can be suppressed from being generated too much, and the segregation phase can be easily localized near the internal electrode layer. Particularly, from the point of suppressing the excessive generation of the segregation phase, it is important to have smaller particle size of the rare earth oxides as the subcomponent material, and also important to have faster temperature increasing rate and to have higher holding temperature while firing.

The capacitor element body obtained as such is then subjected to an end surface polishing, for example, by a barrel polishing or a sand blasting, and the external electrode layer paste is pasted thereon, and then fired, thereby the external electrode 4 is formed. If needed, a covering layer may be formed on the surface of the external electrode 4 by plating or so.

The multilayer ceramic capacitor of the present embodiment produced as such is mounted on the printed-circuit board and the like by soldering and the like to be used in variety of electronic devices and the like.

Hereinabove, an embodiment of the present invention is described, but the present invention is not to be limited to the above-mentioned embodiments and can be variously modified within the scope of the present invention.

In the present embodiment, by controlling the firing conditions and the raw material particle size of the subcomponent, the segregation phase having the rare earth element as the main component is suppressed from forming and also the segregation phase is localized near the internal electrode layer. However, the present invention is not to be limited to this method, and for example the segregation phase having the rare earth element as the main component can be suppressed from forming and also the segregation phase can be localized near the internal electrode layer by below method.

First, the dielectric layer is formed into a multilayer structure, and a larger amount of rare earth oxides is included in the dielectric layer contacting the internal electrode layer compared to the amount of rare earth oxides included in the dielectric layer which does not contact the internal electrode layer. Thereby, many segregation phases including the rare earth element can be localized near the internal electrode layer.

Also, by including the rare earth element oxides in the internal electrode layer paste, many segregation phases including the rare earth element can be localized near the internal electrode layer. This is because the rare earth element oxides diffuse to the dielectric layer from the internal electrode layer during the firing step, thereby the segregation phase is formed near the internal electrode layer.

Also, in the above mentioned embodiment, the multilayer ceramic capacitor is described as an example of the multilayer ceramic electronic component according to the present invention, however it is not limited to the multilayer ceramic capacitor, and it may be any electronic component having the above constitutions.

EXAMPLES

Hereinafter, the present invention will be described based on further detailed examples, but the present invention is not limited to the examples.
(Property Evaluation)

Regarding a capacitor sample obtained in below examples, an area ratio of segregation phases, a ratio of segregation phases which is in contact with an internal electrode layer, a ratio of segregation phases embedded in an internal electrode layer, a ratio of a maximum length of the segregation phase in a stacking direction with respect to an average thickness of the internal electrode layer, an average particle size of a dielectric particle, and measurements of highly accelerated lifetime and a specific permittivity c were obtained by a method shown in below.
<Area Ratio of Segregation Phase>

The capacitor sample was cut in a perpendicular cross section to the dielectric layer. In the cross section, STEM-EDS mapping analysis was carried out to parts which were subjected to determine whether a rare earth element was segregated. In an observation field where 20 layers or more of internal electrode layers were observed, a mapping analysis result was divided into dots of 0.027 μm/pixel, and a numerical value of contrast data in each pixel was obtained. Specifically, the contrast data having weakest contrast intensity (no detection) was defined 0, the contrast data having strongest intensity was defined 90, and the contrast data was categorized into 90 levels. The contrast data of the area of dots having the contrast intensity of rare earth element less than 75 was defined as no segregation, and the area of dots with 75 or more was defined as a segregation phase in which the rare earth element was segregated.

A total area of segregation phases was calculated based on above to obtain a ratio of segregation phases with respect to the entire area of the observation field, thereby the area ratio of segregation phases was obtained. Note that, 8 images were taken per 1 sample, and the average thereof was defined as the area ratio (ppm) of the segregation phase thereof.
<Ratio of Segregation Phases Contacting Internal Electrode Layer>

As similar to above, the cross section of the capacitor sample was subjected to TEM-EDS mapping analysis. From the mapping analysis result of Ni, an outline of the internal electrode layer was formed. Also, an outline of the segregation phase in which the rare earth element was segregated was formed.

In case the outline of the internal electrode layer and the outline of the segregation phase at least shared part of these outlines, then it was considered that the segregation phase was in contact with the internal electrode layer. The total area of segregation phases contacting the internal electrode layer was calculated and the ratio with respect to the area of entire segregation phase was obtained. Thereby, the ratio (%) of segregation phases contacting the internal electrode layer was obtained. Note that, 8 images were taken per 1 sample, and the average thereof was obtained.

<Ratio of Segregation Phases Embedded in Internal Electrode Layer>

As similar to above, in the cross section of the capacitor sample, the outline of the internal electrode layer and the outline of the segregation phase were formed.

A particle sharing 50% or more of the entire length of the outline of the particle identified as the segregation phase with the outline of the internal electrode layer was considered as a segregation phase embedded in the internal electrode layer. All of the segregation particles in the observation field were calculated and a number ratio of the particles identified as the segregation phases embedded in the internal electrode layer was obtained. Thereby, the ratio of segregation phases embedded in the internal electrode layer was obtained. Note that, 8 images were taken per 1 sample, and the average thereof was obtained.

<Average Dielectric Particle Size>

The capacitor sample was polished all the way to a center of the capacitor sample and a polished face was subjected to a thermal etching treatment at a temperature 100° C. lower than the firing temperature. The polished face after the treatment was observed using a field emission scanning electron microscope (FE-SEM), and SEM image by a secondary electron image was taken. This SEM image was subjected to an image processing by software to identify boundary of the dielectric particle, thereby the area of each dielectric particle was calculated. Then, the area of calculated dielectric particle was converted to a circle equivalent diameter and multiplied by 1.27 to obtain the dielectric particle size. This measurement was carried out to 2000 dielectric particles and a median diameter thereof was considered as an average dielectric particle size.

<Specific Permittivity ε>

A capacitance was measured using a digital LCR meter (4274A made by YHP) under the condition of a standard temperature of 25° C., a frequency of 1 kHz, an input signal level (measuring voltage) of 1.0 Vrms, thereby the specific permittivity ε (no unit) was calculated from the capacitance. The higher the specific permittivity is, the more preferable it is. In the present examples, the specific permittivity ε of 2000 to 3000 was considered good and 2200 to 2800 was considered excellent.

<Highly Accelerated Lifetime (HALT)>

The capacitor sample was applied with DC voltage under the electric field of 25 V/μm at 175° C. to measure a lifetime thereby a highly accelerated lifetime was evaluated. In the present example, the lifetime was defined as the time which took for the insulation resistance to drop by one digit from the start of the voltage application. Also, in the present examples, the above mentioned evaluation was carried out to 20 capacitor samples and the average thereof was defined as the highly accelerated lifetime. In the present examples, 50 hours or longer was considered good and 100 hours or longer was considered as excellent.

As raw material powder, below materials were prepared.

<Main Component Raw Material>

BaTiO$_3$ powder (Ba/Ti=1.004, average particle size 0.17 μm)

BaTiO$_3$ powder (Ba/Ti=1.004, average particle size 0.12 μm)

BaTiO$_3$ powder (Ba/Ti=1.004, average particle size 0.28 μm)

<Subcomponent Material>

Dy$_2$O$_3$ (three types were prepared having different average particle size of 0.05 μm, 0.10 μm, and 0.15 μm)

Gd$_2$O$_3$ (average particle size 0.05 μm)

Tb$_2$O$_3$ (average particle size 0.05 μm)

Y$_2$O$_3$ (average particle size 0.05 μm)

Ho$_2$O$_3$ (average particle size 0.05 μm)

Yb$_2$O$_3$ (average particle size 0.05 μm)

<Sample No. 1 to 3>

As the raw material powder of barium titanate, BaTiO$_3$ powder having the average particle size of 0.17 μm was prepared. As the subcomponent raw material, Dy$_2$O$_3$ having the average particle size of 0.05 μm was prepared.

The raw material powders prepared in above were weighed. 1.0 mol of Dy$_2$O$_3$ powder, 1.0 mol of MgO powder, 1.0 mol of SiO$_2$ powder, 0.5 mol of BaCO$_3$ powder, 0.2 mol of MnCO$_3$ powder, and 0.05 mol of V$_2$O$_5$ powder were prepared with respect to 100 mol of BaTiO$_3$. Oxide powders excluding BaTiO$_3$ and Dy$_2$O$_3$ were wet mixed for one hour using a beads mill, then pulverized and dried to obtain the dielectric additive raw material having an average particle size of 0.05 μm. Note that, BaCO$_3$ and MnCO$_3$ become BaO and MnO respectively in the dielectric ceramic composition.

Next, a total of 100 parts by weight of the obtained dielectric additive material, Dy$_2$O$_3$, and BaTiO$_3$; 10 parts by weight of polyvinylbutyral resin, 5 parts by weight of dioctyl phthalate (DOP) as plasticizer; and 100 parts by weight of alcohol as a solvent were mixed by a beads mill to form paste; thereby a dielectric layer paste was obtained.

Also, aside from the above, 44.6 parts by weight of Ni powder, 52 parts by weight of terpineol, 3 parts by weight of ethyl cellulose, and 0.4 parts by weight of benzotriazole were kneaded by triple rolls to form slurry, thereby an internal electrode layer paste was obtained.

Then, using the above obtained dielectric layer paste, a green sheet was formed on a PET film so that the thickness after drying was 4.5 μm. Next, using the internal electrode layer paste, an electrode layer was printed in a predetermined pattern on the green sheet, followed by removing the sheet from the PET film, thereby the green sheet with the electrode layer was obtained. Then, a plurality of green sheets with the electrode layer were stacked and adhered by applying pressure to obtain a green multilayer body. The green multilayer body was cut into a predetermined size to obtain a green chip.

Then, the obtained green chip was subjected to binder removal treatment, firing, and oxidizing treatment under the following conditions, thereby an element body as a sintered body was obtained.

The binder removal treatment was performed under the condition of the temperature increasing rate: 25° C./hour, the holding temperature: 235° C., the temperature holding time: 8 hours, and the atmosphere: air.

The firing condition was performed under the temperature rising rate and the oxygen partial pressure shown in Table 1, and the temperature holding time of 0.5 hours. The temperature decreasing rate from the holding temperature to 1000° C. was 2000° C./hour and from 1000° C. or lower it was 200° C./hour. The atmospheric gas was wet mixed gas of N$_2$+H$_2$ (oxygen partial pressure was 1.0×10$^{-12}$ MPa).

The annealing treatment conditions were the temperature increasing rate: 200° C./hour, the holding temperature: 1050° C., the temperature holding time: 3 hours, the temperature decreasing rate: 200° C./hour, and the atmospheric gas: wet gas of N$_2$ (oxygen partial pressure: 1.0×10$^{-7}$ MPa).

Note that, a wetter was used to wet the atmospheric gas during firing and oxidizing treatment.

Next, after polishing end faces of the obtained element body with sandblast, Cu was coated as an external electrode to obtain the multilayer ceramic capacitor sample shown in FIG. 1. The size of the obtained capacitor sample was 3.2 mm×1.6 mm×0.7 mm, the thickness of the dielectric layer was 3 μm, and the thickness of the internal electrode layer was 1.0 μm. Also, in general, as the numbers of the dielectric layers placed between the internal electrode layers increase, a reliability such as a highly accelerated lifetime and the like tends to decrease, thus in the examples of the present invention, the numbers of the dielectric layers were 100 layers to observe the change of the highly accelerated lifetime easier.

<Sample No. 4 to 6>

A dielectric layer paste was prepared as similar to Sample No. 1, except that in Sample No. 4 and 5, powder having the average particle size of 0.10 μm was used as $Dy_2O_3$, and in Sample No. 6, powder having the average particle size of 0.15 μm was used as $Dy_2O_3$.

A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

<Sample No. 7 and 8>

A dielectric layer paste was prepared as similar to Sample No. 1, except that in Sample No. 7, $BaTiO_3$ powder having the average particle size of 0.12 μm was used, and in Sample No. 8, $BaTiO_3$ powder having the average particle size of 0.28 μm was used.

A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

<Sample No. 9 to 12>

A dielectric layer paste was prepared as same as Sample No. 1 except that instead of using $Dy_2O_3$ powder, $Gd_2O_3$ powder was used in Sample No. 9, $Tb_2O_3$ powder used in Sample No. 10, $Y_2O_3$ powder was used in Sample No. 11, and $Ho_2O_3$ powder was used in Sample No. 12.

A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

<Sample No. 13 to 15>

A dielectric layer paste was prepared as same as Sample No. 1 except for following. In Sample No. 13, as a rare earth compound, 1.0 mol of $Dy_2O_3$ powder (average particle size 0.05 μm) and 0.3 mol of $Ho_2O_3$ powder were used with respect to 100 mol of $BaTiO_3$. In Sample No. 14, as a rare earth compound, 1.0 mol of $Dy_2O_3$ powder (average particle size 0.05 μm), 0.3 mol of $Ho_2O_3$ powder, and 0.2 mol of $Yb_2O_3$ powder were used with respect to 100 mol of $BaTiO_3$. In Sample No. 15, as a rare earth compound, 1.0 mol of $Dy_2O_3$ powder (average particle size 0.05 μm), 0.3 mol of $Tb_2O_3$ powder, 0.2 mol of $Yb_2O_3$ powder were used with respect to 100 mol of $BaTiO_3$.

A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

<Sample No. 16>

A dielectric layer paste was prepared as same as Sample No. 1 except that an amount of $Dy_2O_3$ powder used with respect to 100 mol of $BaTiO_3$ was changed to 0.8 mol. A green chip was obtained as similar to Sample No. 1 except for using the obtained dielectric layer paste. As firing conditions, a temperature increasing rate and a holding temperature shown in Table 1 were employed, and a multilayer ceramic capacitor was obtained as similar to Sample No. 1.

The temperature increasing rate, the holding temperature, the average particle size of $BaTiO_3$, the type and average particle size of the rare earth oxides, and the blending amount of the rare earth oxides with respect to 100 mol of $BaTiO_3$ during the preparation of each capacitor sample are shown in Table 1. Note that, in Table 1, "Dy: 0.05" in a column indicated as "Type of rare earth component: Average particle size" refers to $Dy_2O_3$ powder having the average particle size of 0.05 Also, "Dy: 1" in a column indicated as "Blending amount of rare earth oxides" means that 1 mol of $Dy_2O_3$ powder with respect to 100 mol of $BaTiO_3$ was used. Same applies to other rare earth oxides.

Also, an area ratio of a segregation phase in each capacitor sample, a ratio of a segregation phase contacting the internal electrode layer, a ratio of a segregation phase embedded in an internal electrode layer, a ratio of a maximum length of a segregation phase in stacking direction with respect to an average thickness of an internal electrode layer, and measurement results of a highly accelerated lifetime and specific permittivity c are shown in Table 2. Note that, in Tables, the samples indicated with "*" did not satisfy the area ratio of the segregation phase or the area ratio of the segregation phase contacting the internal electrode layer according to the present invention.

TABLE 1

| Sample No. | Temp. Increasing rate [° C./hour] | Holding temp. [° C.] | $BaTiO_3$ average particle size (μm) | Rare earth oxides Type: Average particle size | Blending amount of rare earth (mol) |
|---|---|---|---|---|---|
| 1 | 2000 | 1300 | 0.17 | Dy: 0.05 | Dy: 1 |
| 2 | 2000 | 1280 | 0.17 | Dy: 0.05 | Dy: 1 |
| 3 | 2000 | 1260 | 0.17 | Dy: 0.05 | Dy: 1 |
| *4 | 200 | 1280 | 0.17 | Dy: 0.10 | Dy: 1 |
| *5 | 2000 | 1240 | 0.17 | Dy: 0.10 | Dy: 1 |
| *6 | 200 | 1240 | 0.17 | Dy: 0.15 | Dy: 1 |
| 7 | 2000 | 1260 | 0.12 | Dy: 0.05 | Dy: 1 |
| 8 | 2000 | 1300 | 0.28 | Dy: 0.05 | Dy: 1 |
| 9 | 2000 | 1300 | 0.17 | Gd: 0.05 | Gd: 1 |
| 10 | 2000 | 1280 | 0.17 | Tb: 0.05 | Tb: 1 |
| 11 | 2000 | 1280 | 0.17 | Y: 0.05 | Y: 1 |
| 12 | 2000 | 1260 | 0.17 | Ho: 0.05 | Ho: 1 |
| 13 | 2000 | 1280 | 0.17 | Dy: 0.05, Ho: 0.05 | Dy: 1, Ho: 0.3 |
| 11 | 2000 | 1280 | 0.17 | Dy: 0.05, Ho: 0.05, Yb: 0.05 | Dy: 1, Ho: 0.3, Yb: 0.2 |
| 15 | 2000 | 1280 | 0.17 | Dy: 0.05, Tb: 0.05, Yb: 0.05 | Dy: 1, Tb: 0.3, Yb: 0.2 |
| *16 | 2000 | 1280 | 0.17 | Dy: 0.05 | Dy: 0.8 |

TABLE 2

| Sample No. | Area ratio of segregation phase [ppm] | Ratio of segregation phase contacting electrode [%] | Max length of segregation phase in stacking direction/ Electrode thickness [%] | Ratio of segregation phase embedded in electrode layer [%] | Dielectric particle average particle size [μm] | Specific permittivity | High temp. accelerated lifetime [Hour] |
|---|---|---|---|---|---|---|---|
| 1 | 104 | 100 | 89 | 82 | 0.21 | 2637 | 153 |
| 2 | 465 | 100 | 97 | 78 | 0.21 | 2463 | 187 |
| 3 | 961 | 98 | 102 | 74 | 0.21 | 2181 | 57 |
| ※4 | 923 | 83 | 95 | 44 | 0.20 | 2024 | 45 |
| ※5 | 1127 | 96 | 120 | 61 | 0.20 | 2001 | 38 |
| ※6 | 1218 | 76 | 187 | 27 | 0.17 | 1756 | 4 |
| 7 | 327 | 100 | 98 | 76 | 0.13 | 2058 | 143 |
| 8 | 637 | 98 | 105 | 69 | 0.3 | 2943 | 86 |
| 9 | 433 | 100 | 103 | 74 | 0.24 | 2858 | 82 |
| 10 | 481 | 100 | 104 | 79 | 0.23 | 2693 | 89 |
| 11 | 594 | 100 | 105 | 65 | 0.20 | 2329 | 104 |
| 12 | 627 | 96 | 107 | 57 | 0.19 | 2204 | 121 |
| 13 | 521 | 100 | 98 | 81 | 0.20 | 2561 | 165 |
| 14 | 618 | 100 | 101 | 76 | 0.20 | 2318 | 191 |
| 15 | 496 | 100 | 102 | 84 | 0.20 | 2284 | 178 |
| ※16 | 16 | 100 | 96 | 100 | 0.19 | 3582 | 3 |

Figure 3:
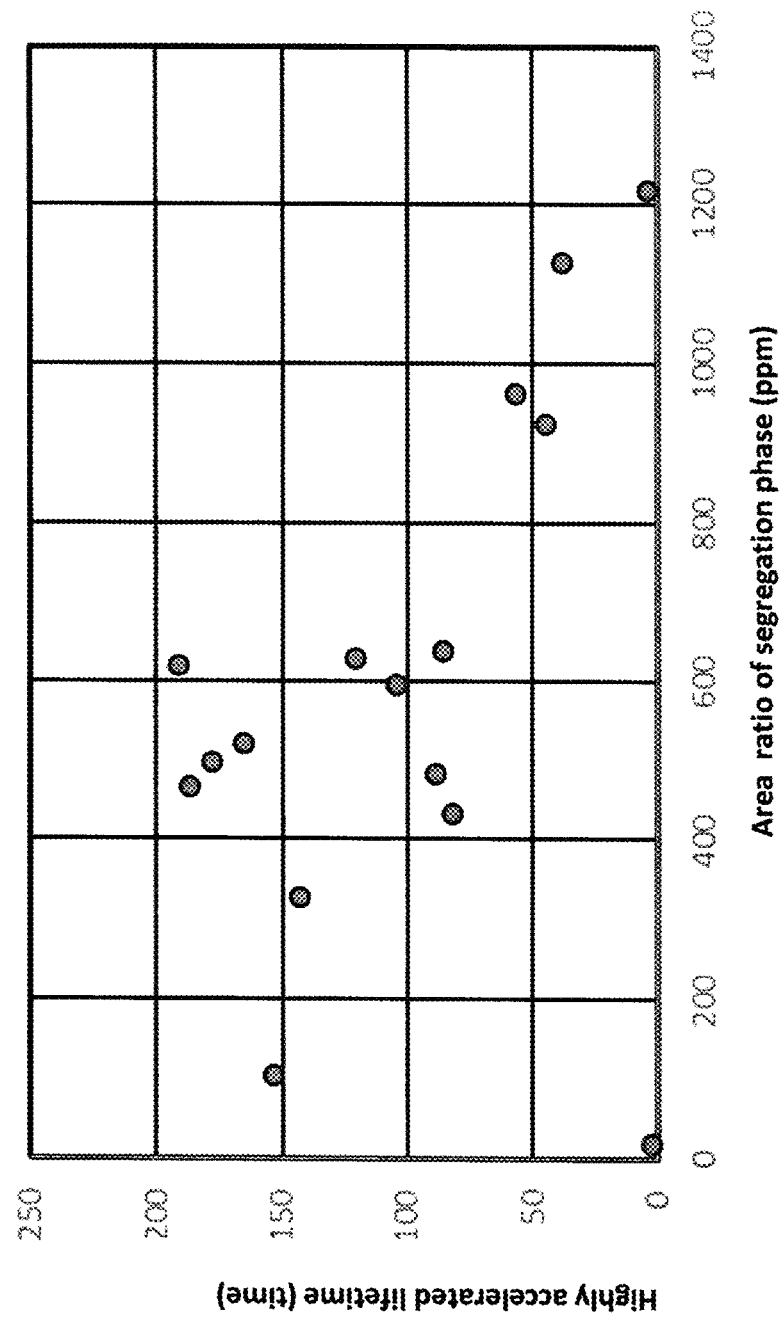
FIG. 3 shows a relation between a highly accelerated lifetime and a segregation of each sample.

According to Table 2, the multilayer ceramic capacitor (Sample No. 1 to 3 and 7 to 15) had particularly good highly accelerated lifetime and specific permittivity when the area ratio of segregation phases was 104 ppm to 961 ppm and a total area ratio of segregation phases contacting the internal electrode layer was 96% or more of the entire segregation phase area compared to the capacitor outside of these ranges (Sample No. 4 to 6 and 16). Also, regarding the capacitor (Sample No. 1, 2, 7, and 13) in which the maximum length of the segregation phase in stacking direction was 100% or less with respect to the average thickness of the internal electrode layer, the highly accelerated lifetime was improved to 140 hours or longer. The relation between the highly accelerated lifetime and the area ratio of segregation phases in each sample is shown in FIG. 3.

REFERENCES OF NUMERALS

1 . . . Multilayer ceramic capacitor
2 . . . Dielectric layer
3 . . . Internal electrode layer
3a . . . Discontinuous part
4 . . . External electrode
5 . . . Segregation phase
10 . . . Capacitor element main body

What is claimed is:

1. A multilayer ceramic electronic component comprising a multilayer body in which an internal electrode layer and a dielectric layer are stacked in alternating manner,
    wherein the dielectric layer comprises a dielectric ceramic composition having a main component expressed by a general formula $ABO_3$ (A is at least one selected from the group consisting of Ba, Sr, and Ca; and B is at least one selected from the group consisting of Ti, Zr, and Hf) and a rare earth component R (R is at least one selected from the group consisting of Sc, Y, La, Ce, Pr, Nd, Pm, Sm, Eu, Gd, Tb, Dy, Ho, Er, Tm, Yb, and Lu), segregation phase particles including the rare earth component R exist in the dielectric layer,
    an area ratio of segregation phase particles in a cross section along a stacking direction is 104 ppm to 961 ppm, and
    a total area of the segregation phase particles that contacts with the internal electrode layer is 96% or more of a total area of all segregation phase particles.

2. The multilayer ceramic electronic component according to claim 1, wherein a maximum length of the segregation phase in the stacking direction is 100% or less with respect to an average thickness of the internal electrode layer.

3. The multilayer ceramic electronic component according to claim 1, wherein 50% or more of the total segregation phases in terms of number base are embedded in the internal electrode layer.

4. The multilayer ceramic electronic component according to claim 2, wherein 50% or more of the total segregation phases in terms of number base are embedded in the internal electrode layer.

5. A multilayer ceramic electronic component comprising a multilayer body in which an internal electrode layer and a dielectric layer are stacked in alternating manner,
    wherein the dielectric layer comprises a dielectric ceramic composition having a main component expressed by a general formula $ABO_3$ (A is at least one selected from the group consisting of Ba, Sr, and Ca; and B is at least one selected from the group consisting of Ti, Zr, and Hf) and a rare earth component R (R is at least one selected from the group consisting of Sc, Y, La, Ce, Pr, Nd, Pm, Sm, Eu, Gd, Tb, Dy, Ho, Er, Tm, Yb, and Lu),
    segregation phase particles including the rare earth component R exist in the dielectric layer,
    an area ratio of segregation phase particles in a cross section along a stacking direction is 104 ppm to 961 ppm, and
    a ratio of a number of segregation phase particles that contact with the internal electrode layer to a total number of all segregation phase particles is 96% or more.

* * * * *